United States Patent [19]

McAuliffe

[11] 3,727,153

[45] Apr. 10, 1973

[54] AUTOMATIC EQUALIZER USING RECIRCULATION

[75] Inventor: Gerald K. McAuliffe, Mahopac, N.Y.

[73] Assignee: International Business Machines Corporation, Armonk, N.Y.

[22] Filed: June 30, 1971

[21] Appl. No.: 158,416

[52] U.S. Cl. ....................333/18, 325/42, 333/70 T

[51] Int. Cl. ....................H04b 3/04

[58] Field of Search ....................333/18, 28, 70 T; 328/165; 325/42, 65

[56] References Cited

UNITED STATES PATENTS

| | | | |
|---|---|---|---|
| 3,305,798 | 2/1967 | Rappeport | 333/18 |
| 3,508,153 | 4/1970 | Gerrish et al. | 333/18 X |
| 3,609,597 | 9/1971 | Moye | 333/18 |

*Primary Examiner*—Paul L. Gensler
*Attorney*—T. J. Kilgannon, Jr. et al.

[57] ABSTRACT

An automatic equalizer with extremely fast convergence is disclosed. The weight setting procedure or algorithm used is basically an iterative operation which can be conveniently expressed by the function $1+A+A^2+\ldots+A^{2n-1}$ where $n=0, 1, 2, 3, \ldots$, and wherein the function has n+1 terms. The tap setting algorithm results from the modification of an input signal represented by the function 1—A in an equalizer having a plurality of tap settings; subsequently converting the modified function in a summer which adds the values 1 or 2 to the negative of the modified signal; recirculating the resulting function and subjecting it to a further modification in the equalizer, the modification being the same as that initially applied and utilizing the resulting output to adjust the tap settings of an equalizer to modify an input signal represented by the function 1—A during the next succeeding iteration. This procedure is carried out iteratively until the value A which represents the distortion of the signal due to sidelobes is reduced to substantially zero value. The tap setting may be accomplished by totally replacing the previous tap settings with net tap settings or the previous tap setting may be incremented to provide a new tap setting.

30 Claims, 2 Drawing Figures

INVENTOR
GERALD K. McAULIFFE

BY Thomas J. Kilgannon Jr.
ATTORNEY

AUTOMATIC EQUALIZER USING RECIRCULATION

BACKGROUND OF THE INVENTION

1. Field of the Invention

This invention generally relates to systems and their method of operation which eliminate or reduce distortion which appears on electrical signals used for digital data transmission. More specifically, it relates to automatic equalization systems and to a method of operation which has extremely fast convergence, that is, a given amount of distortion can be essentially eliminated in a minimal time. One implementation consists of a single equalizer the taps of which are adjusted once per iteration in accordance with a given algorithm. In this arrangement, the output of the equalizer stage after an initial modification therein is converted in a summer and recirculated through the same equalizer stage. After recirculation, the output of the equalizer stage is utilized to activate a tap control means which in turn activates the tap settings on the equalizer to provide new tap settings for the next succeeding iteration. Instead of recirculating through the original equalizer, a different equalizer arrangement may be utilized which incorporates a slave equalizer identical with the original equalizer which permits substantially faster convergence.

2. Description of the Prior Art

When signals are transmitted through a transmission medium, a certain amount of distortion usually results even under noiseless conditions. The distortion encountered may be attributed to the undesirable characteristics of the transmission medium. In the basic form of digital data transmission, symbols from a finite alphabet are transmitted at a fixed rate as pulses of various magnitudes or some other modulated signal waveform. At the receiving end, the received signal is periodically sampled at the same rate to determine what the input signals were. Distortion of the received waveforms results in intersymbol interference between adjacent samples. Typically, a pulse at the transmitter will appear at the receiver to contain a main pulse and a number of "sidelobes" on both sides of the main pulse. In binary data transmission, the sum of the magnitudes of the sidelobes is defined as the total distortion when the main pulse is scaled or normalized to unity.

To minimize undesired intersymbol interference due to linear distortion, filters having compensating characteristics called "equalizers" are used. A special class of time-domain filters is particularly suitable in digital transmissions. Basically, a time-domain filter consists of a number of delay sections in series each section having the same delay, a number of taps between the delay sections with adjustable tap gains, and a summing circuit or element. Two types of time-domain filters are: the non-recursive or transversal type and, the recursive type. Since the usual channel characteristics are not known beforehand and may be subject to time variations, it is necessary to be able to automatically tune the equalizer to any desired channel. This means that a system must be devised to obtain weights for the tap gains such that the total distortion is reduced to a minimum.

A general procedure for the automatic adjustment of an equalizer during a training period is to send a train of isolated pulses through a channel prior to actual data transmission. A weight adjustment of the tap gains takes place immediately after each training pulse.

Using the above-mentioned principle, a weight correction procedure has been implemented as an automatic equalizer by the prior art. Using this technique, the channel response can be greatly improved. As a result, multilevel transmissions up to sixteen levels over some of voice grade channels now seems feasible. A small correction increment would result in better equalization, but it would also require a greater convergence time. At present, there are a number of modifications of the iterative weight-correction scheme which permit improved convergence. An iterative equalization procedure and apparatus which provides an identical output using a plurality of cascaded equalizer stages is disclosed in a commonly assigned co-pending application entitled "Automatic Equalizer and Method of Operation Therefor," by R.T. Sha et al., Ser. No. 103,235, filed Dec. 31, 1970. The present application differs from the co-pending application both from the apparatus and tap setting algorithm points of view. In the present application, the output of an equalizer stage is modified and recirculated through the same or a slave equalizer stage. The output after recirculation for each iteration represents the tap settings applied in a replacement or incremental mode to the equalizer stage or stages prior to the next iteration. The output of the equalizer stage prior to recirculation is identical, however, with the output of a cascaded equalizer stage of the co-pending application for the same iteration.

Recent trends in data communications demand faster convergence in automatic equalizers because it is important to improve the system's efficiency by minimizing the turnaround time in high speed data transmission systems. For this reason, fast convergence in weight adjustment is extremely desirable in any sort of computer-communication systems. Such systems are ones with multi-drop remote terminals, time sharing or multiplexing systems and the like. In view of this, automatic equalizers with performance capabilities beyond existing systems are required which specifically take into consideration the minimizing of convergence time. The main distinction between the prior art equalizers and the equalizers of the present invention is that the distortion corrections of the equalizers in the known structures are additive from one iteration to the other but are multiplicative in the equalizers of the present invention.

SUMMARY OF THE INVENTION

The present invention relates generally to methods and apparatuses for equalizing electrical signals which have been subjected to distortion by a transmission medium. The method of the present invention, in its broadest aspect, comprises the steps of applying an electrical signal sequence represented by the function $1-A$ to at least an equalizer having a plurality of adjustable tap settings and modifying the signal to adjust the tap settings of the equalizer in accordance with the function $1+A+A^2+\ldots+A^{2^n-1}$ the function having $n+1$ terms. The modifying steps produces at the output of the equalizer for each iteration the product represented by the function $1-A^{2^n}$ where $n = 1, 2, 3, \ldots$ . More specifically, the method of the present invention which calls for the step of modifying the signal includes the steps of applying the signal to at least one equalizer to obtain at the output thereof a modified signal represented by the function $1-A^{2^n}$ and converting the modified signal in a summing circuit to obtain a signal represented by the converted function $1+A^{2^n}$. Also included in the modifying step are the steps of recirculating the converted function through said at least an equalizer to obtain a signal represented by the function $1+A+A^2+\ldots+A^{2^n-1}$ and replacing the tap settings utilized during the present iteration with new tap settings in accordance with a signal represented by the last mentioned function. In accordance with more specific steps, the method of the present invention which calls for the step of modifying includes the steps of recirculating the converted function through a slave equalizer having a plurality of tap settings instead of recirculating the converted function through said at least an equalizer.

In accordance with still more specific steps, the method of the present invention includes the steps of converting the modified signal in a summing circuit to obtain a signal represented by the converted function $A^{2^n}$; recirculating the converted function through said at least an equalizer to obtain a signal represented by the incrementing function $A^{2^n}+A^{2^n+1}+A^{2^n+2}+\ldots+A^{2^{(n+1)}-1}$; the incrementing function having $2^n$ terms and, incrementing the tap settings utilized during the present iteration with the incrementing function to provide a new tap setting represented by the function $1+A+A^2+\ldots+A^{2^n-1}$.

Instead of recirculating the converted function through at least an equalizer, the method of the present invention includes the step of recirculating the converted function through a slave equalizer having a plurality of tap settings to obtain a signal represented by the same incrementing function as mentioned hereinabove.

In its broadest aspect, apparatus for equalizing an electrical signal in accordance with the teaching of the present invention comprises input means for applying an electrical signal represented by the function $1-A$ to at least an equalizer having a plurality of tap settings for $n$ iterations and means connected to said at least an equalizer for modifying said signal to adjust the tap settings of the equalizer in accordance with the function $1+A+A^2+\ldots+A^{2^n-1}$; the function having $n+1$ terms. Modifying the signal as indicated produces at the output of the equalizer for each iteration the product represented by the function $1-A^{2^n}$ where $n = 1, 2, 3, \ldots$.

In accordance with more specific aspects of the present invention, the means for modifying includes first modifying means connected to the equalizer for modifying the electrical signals providing at the output thereof a modified signal represented by the function $1-A^{2^n}$, and means connected to the output for converting the modified signal to provide a signal represented by the converted function $1+A^{2^n}$. Also included are means for recirculating the converted function through said at least an equalizer connected to the converting means to provide at the equalizer output a signal represented by the function $1+A+A^2+\ldots+A^{2^n-1}$ and, means connected to the tap settings and the equalizer output for replacing the tap settings utilized during the present iteration with new tap settings in accordance with a signal represented by the last mentioned function. Instead of means for recirculating the converted function, second modifying means connected to the converting means are provided for modifying the converted function to provide a signal represented by the function $1+A+A^2+\ldots+A^{2^n-1}$.

In accordance with still more specific aspects of the present invention, the converting means also provide a signal represented by the converted function $A^{2^n}$. Means for recirculating the converted function through said at least an equalizer to obtain a signal represented by an incrementing function $A^{2^n+1}+A^{2^n2+}+\ldots+A^{2^{(n+1)}-1}$ is also provided; the incrementing function having 2 terms. Means connected to the recirculating means and a first modifying means for incrementing the tap settings utilized during the present iteration to provide a new tap setting are also provided. Finally, second modifying means may be substituted for the recirculating means which is connected to the converting means for modifying the converted function to provide a signal represented by the incrementing function indicated hereinabove.

In accordance with more specific aspects, the means for converting includes a summing amplifier which adds either 1 or 2 to the negative of a modified signal represented by the function $1-A^{2^n}$ depending upon which of two possible modes of operation is being utilized. When the incrementing mode is being used, the summing amplifier adds 1 and, when the replacement mode is being utilized, the summing amplifier adds 2.

The above mentioned method and apparatus permits equalization of both distorted digital and analog signals at extremely high convergence rates. This is very significant at a time when central processing units are being asked to service a large number of remote terminals using commercially available communications, i.e., telephone lines. Under such circumstances maximum equalization of a distorted signal should be achieved in a minimum of time using a minimum of hardware to render the transmission of data less costly for the user and more highly efficient for the data processor. The apparatus and method of the present invention is believed to satisfy both of the aforementioned requirements.

It is therefore, an object of the present invention to provide method and apparatus for equalizing an electrical signal which has extremely fast convergence.

Another object is to provide an automatic equalizer and method of operation therefore which is suitable for use with both digital and analog signals.

Still another object is to provide an iterative equalization operation using a single equalizer stage or a single equalizer stage in combination with a slave equalizer which can be economically implemented.

The foregoing and other objects, features and advantages of the present invention will be apparent from the following more particular description of preferred embodiments as illustrated in the accompanying drawings:

DESCRIPTION OF THE PREFERRED EMBODIMENTS

Figures 1, 2:
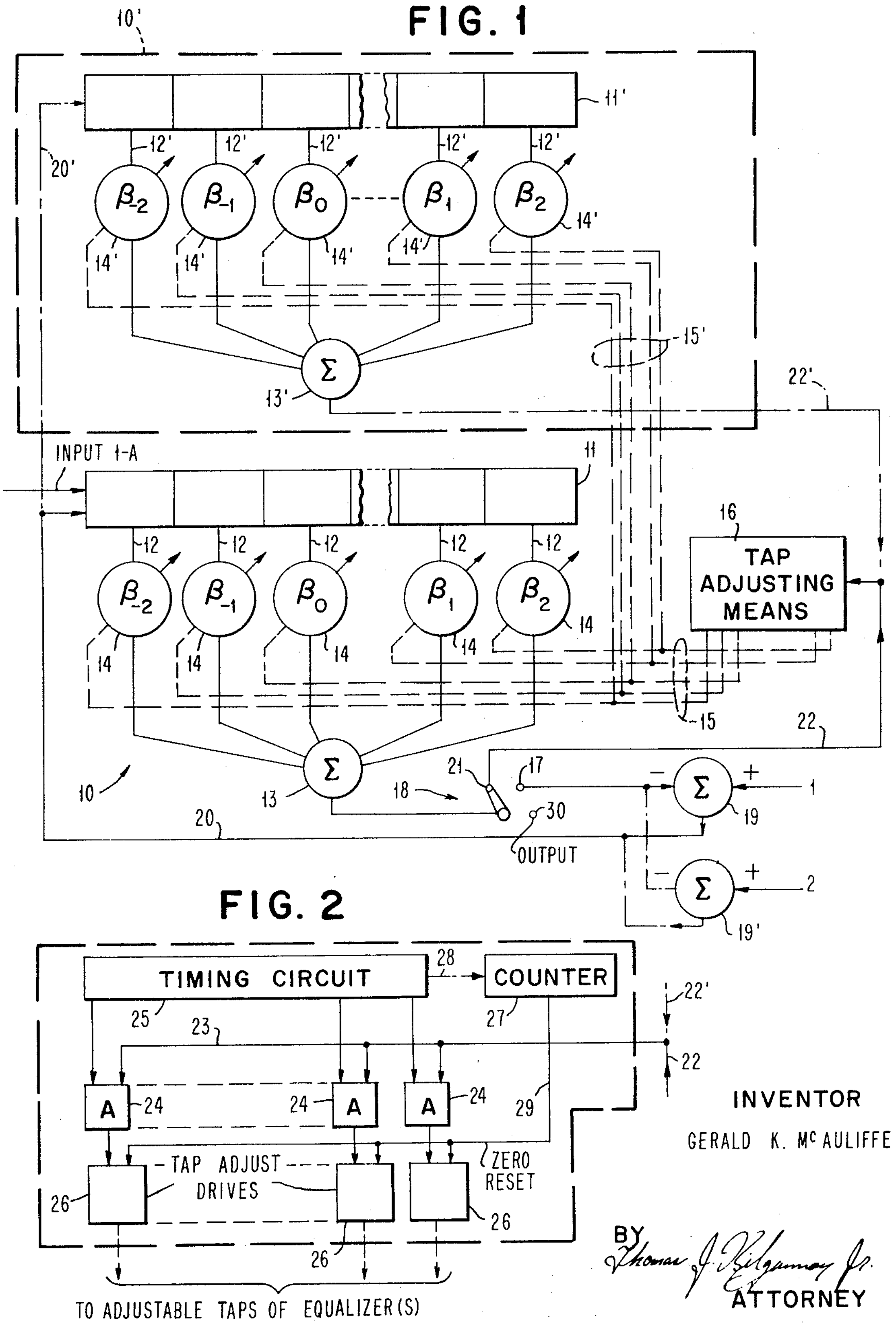
FIG. 1 is an equalizer arrangement in accordance with the present invention showing an equalizer stage and a slave equalizer stage, their associated adjustable tap settings, summing circuits which convert the output of the equalizer stage and tap adjusting means associated with the equalizer and slave equalizer stages which adjusts the tap settings in accordance with the output which has been recirculated through either the equalizer or the slave equalizer. The slave equalizer is identical with the first mentioned equalizer.
FIG. 2 is a block diagram of the tap adjusting means shown in FIG. 1 which converts the output sequence of the first mentioned equalizer or, alternatively, of the salve equalizer to signals which adjust the taps of the first mentioned equalizer alone or the taps of both the first mentioned equalizer and the slave equalizer at the same time.

Referring now to FIG. 1, there is shown therein a block diagram of an equalizer arrangement which consists of either a single equalizer stage or the same equalizer stage in combination with a slave equalizer. The elements of each of equalizer stages 10 and 10' are well known to those skilled in the equalizer art and act to reduce the distortion on a digital or analog signal to substantially zero by applying the negative of values obtained during sampling instants to the delay line via multipliers to substantially eliminate distortion in the form of front and rear sidelobes about a main signal pulse. Because of interaction between various portions of the signal pulse, elimination of the sidelobes is not achieved instantly but requires that the sidelobe elimination at the sampling instants take place over a number of iterations.

To aid in the understanding of the equalization process, let $\{\alpha_k\}=\{\alpha_{-N}, \ldots, \alpha_0, \alpha_1 \ldots \alpha_N\}$ be sampled values of the output of a transmission medium in response to a unit pulse input. The $\{\alpha_k\}$ is also the input sequence to the equalizer and can be decomposed as the main pulse and sidelobes, 1—A.

In terms of $z$ transform:

$$A=\alpha_{-N}z^{N}+\alpha_{-N+1}z^{N-1}+\ldots\alpha_0+\ldots\alpha_N 2^{-N}$$

It is well known (page 134 of Lucky et al., "Principle of Data Communications," McGraw Hill, 1968) that a linear digital filter (or equalizer) is characterized by its "transfer function" defined as the ratio of $z$-transforms of the output and input sequences. It is also well known that the tap settings in a nonrecursive transversal filter corresponds directly to the coefficients in its transfer function. More specifically, the transfer function of an equalizer stage 10 in FIG. 1 is:

$$\beta_{-N}+\beta_{-N+1}z^{-1}+\beta_{-N+2}z^{-2}+\ldots+\beta_z z^{-2N}=$$
$$2^{-N}\left[\beta_{-N}z^{N}+\beta_{-N+1}z^{N-1}+\ldots+\beta_N z^{-N}\right]$$

The inherent delay of n-sampling periods represented by $1^{-N}$ is automatically compensated by reading the output sequence with the same amount of delay. For a given input sequence to an equalizer, the $z$-transform expression of the output sequence is simply the product of the $z$-transform of the input sequence and the transfer function of the equalizer. The multiplication of the polynomials follows the ordinary rules for polynomial multiplication.

Referring now to FIG. 1, there is shown therein embodiments of the equalizer arrangement in accordance with the teaching of the present invention which show the use of only a single equalizer and the use of a slave equalizer in combination with the original equalizer. Considering first the embodiment which utilizes only a single equalizer, equalizer 10 in FIG. 1 comprises a uniform delay line 11 having taps 12 uniformly spaced along the length thereof at desired intervals. A shift register having a plurality of individual stages may be substituted in place of delay line 11 without departing from the spirit and scope of the present invention. Taps 12 are connected to an output via a summing amplifier 13 or other device that permits signal addition. Signal multipliers 14 are interposed between individual taps 12 from delay line 11 and summing amplifier 13. Signal multipliers 14 may be any one of a number of devices well known to those skilled in the equalizer art which may be adjusted either electrically or mechanically to provide desired tap settings of proper weights and polarities. In the present arrangement, it is the adjustment of multipliers 14 to values as determined by the algorithm utilized which determines the transmission characteristics of the overall system. Dotted lines 15 connected to the arrows associated with each of the multipliers 14 represent a mechanical linkage from tap adjustment means 16 shown in block diagram form in FIG. 1 and more specifically indicated in FIG. 2. An input sequence represented by the function 1-A is applied to delay line 11 and modified in accordance with the tap settings of multipliers 14 in delay line 11 and is passed via summing amplifier 13 and contact 17 of switch 18 to a summing circuit 19 which converts the input function 1-A to the function $A^{2^n}$ when the equalizer arrangement of FIG. 1 is operating in an incremental mode. Switch 18 may be any mechanically or electronically actuated switch which is capable of connecting its input to a plurality of output contacts. Such switches are well known to those skilled in the electronics art and are commercially available. In the incremental mode, the increment to be added to the tap settings of signal multipliers 14 is determined in the manner just described. Summing circuit 19, in effect, adds 1 to the negative of the input function. Generally, this summing function is accomplished by detecting the center of the input sequence using a threshold detector. Upon detecting the center pulse, a gate is opened and the value 1 is added to the value of the center pulse. For the 0th iteration, for example, this operation may be characterized mathematically as:

$$1-(1-A)=A.$$

In another mode of operation characterized as the replacement mode, the output of summing amplifier 13 is applied to a summing circuit 19' via contact 19 on switch 18 where the input function 1—A is converted to the function 1+A. Summing circuit 19' in effect adds 2 to the negative of the input function. Again, this summing function is usually accomplished by detecting the center of the input sequence using a threshold detector. Upon detecting the center pulse, a gate is opened and the value 2 is added to the value of the center pulse. This operation may be characterized mathematically as:

$$2-(1-A)=1+A$$

In the replacement mode, the tap settings of signal multipliers 14 are totally replaced, that is, the tap settings used in the previous iteration are removed and the new tap settings are adjusted by tap adjusting means 16 to values as determined using the remainder of the procedure to be detailed in what follows.

In connection with summing circuits 19, 19', analog or digital versions of summing circuits are well known to those skilled in the computer and equalizer art. Typical analog embodiments may be found in a volume entitled, "Analog computation" by A. S. Jackson, McGraw-Hill Book Company, 1960 on page 47. Typical digital versions may be found in "Analog and Digital Computer Technology" by N. Scott, McGraw-Hill Book Company, 1960 on page 325.

Continuing with the description of the single equalizer embodiment of FIG. 1 and considering the incremental mode of operation, the output of summing circuit 19 is applied via conductor 20 to the input of delay line 11. The converted output of summing amplifier 19 represented by the function A is applied to delay line 11 wherein it is once again modified by the tap settings of multipliers 14 which, in the instance being described, have all been set to 0 with the exception of the center tap which was set to 1 for the initial iteration which can be also described as the 0th iteration. The modified signal represented by the function A is again modified by the equalizer tap settings and produces at the output of summing amplifier 13 the signal represented by the product 1(A) which is to be used to activate tap adjusting means 16 via contact 21 and lead 22 on switch 18. Tap adjusting means 16 provides an output which is utilized to adjust the tap settings represented by arrows in multipliers 14. The tap settings of multipliers 14 are adjusted by mechanical linkages which are represented by dashed lines 15 in FIG. 1 which emanates as outputs from tap adjusting means 16.

In the replacement mode, the output signal represented by the function 1+A of summing amplifier 19' is applied via conductor 20 to the input of delay line 11. This signal is then modified in delay line 11 by the tap settings of multipliers 14 which in the present instance have all been set to 0 with the exception of the center tap which has been set to 1 during the initial or $0^{th}$ iteration. The signal 1+A is modified in delay line 11 and appears at the output of summing amplifier 13 as a signal represented by the product 1(1+A) which is applied via contact 21 and lead 22 on switch 18 to tap adjusting means 16.

Utilizing the above generally described arrangement, the recirculated output of equalizer stage 10 for both the incremental and replacement modes is applied to tap adjusting means 16 which provides mechanical outputs which adjusts the tap settings of multipliers 14 in accordance with the mode being utilized. In this manner, the tap settings of multipliers 14 are adjusted prior to the next iteration. Each succeeding iteration is handled in the same general way except that the input sequence is modified differently during each iteration.

Where the incremental mode is utilized, the adjustment of the tap settings on multipliers 14 is straightforward and no different from that achieved in prior art automatic equalizers. However, where the replacement mode is utilized the tap settings of multipliers 14 must be adjusted to 0 prior to the adjustment of each tap setting to the value determined by the system tap adjusting algorithm. Thus, a precursor signal may be obtained from tap adjusting means 16 which resets the tap settings of multipliers 14 to 0 prior to setting the same tap settings in accordance with the system tap setting algorithm.

An arrangement which may be utilized for tap adjusting means 16 is shown in block diagram form in FIG. 2. The output of summing amplifier 13, after recirculation is applied via a conductor 22 to tap adjusting means 16 Conductor 22 passes the output signal via conductor 23 to a plurality of AND gates 24. The number of AND gates 24 is equal to the number of multipliers 14 associated with equalizer stage 10. A timing circuit 25 provides a separate output connection to each of AND gates 24. Although not specifically shown, it should be appreciated that AND gates 24 are energized simultaneously when, in the operation of the equalizer, the samples of the input signal arrive at their associated AND gates. Each AND gate 24 provides an output when there is coincidence between a timing circuit pulse applied to AND gates 24 from timing circuit 25 and a sampled value of the output of equalizer stage 10 after a single iteration. The output of AND gates 24 is applied to tap adjust drives shown as blocks 26 in FIG. 2. Tap adjust drives 26 may include a small motor the output of which is proportional to the output of an associated AND gate 24. These arrangements are so well known to those skilled in the equalizer art that a detailed explanation of the tap adjust drives is unnecessary. U.S. Pat. No. 3,289,108 in the name of Davey et al., issued Nov. 29, 1966 shows in FIGS. 2 and 3 thereof a multiplier arrangement and a circuit arrangement of control signal producing circuitry, respectively which could be utilized in the practice of the present invention. Tap adjust drives 26 provide a mechanical output proportional to the output of AND gates 24 which is mechanically coupled via linkages represented by dashed lines 15 to the adjustable tap settings of multipliers 14 associated with equalizer stage 10. Thus, for the incremental mode, the adjustment of the tap settings is no different from that usually carried out in connection with any prior art equalizer. However, using the replacement mode of operation of equalizer 10, as indicated hereinafter, the tap settings of multipliers 14 must be set to 0 prior to the setting of these tap settings in accordance with the system algorithm after each iteration. This may be accomplished using a counter circuit arrangement shown as block 27 in FIG. 2. Since all the system delays can be accounted for in the operation of equalizer 10 and are represented by the summation of the individual delays encountered in passing the signal from its initial input to the output of summing amplifier 13 after recirculating, counter 27 may be adjusted to provide an output after counting the desired number of timing pulses from timing circuit 25. Timing circuit 25 is connected to counter 27 via conductor 28 (shown as a dashed line in FIG. 2). The output of counter 27 is provided to each of tap adjust drives 26 via conductor 29 and is of a polarity and amplitudes sufficient to drive the multiplier tap settings to 0 regardless of their present setting. Thereafter, tap adjust drives 26 respond to the outputs of AND gates 24 in same manner described hereinafter in connection with the incremental mode of operation. From the foregoing, it should be appreciated that for both the incremental and replacement modes a different tap adjustment per iteration is provided so that each succeeding input sequence is changed to the extent that the tap settings of equalizer stage 10 have been changed during a previous iteration. As will be seen hereinafter, considering only the actual value of the tap settings after any iteration, the overall tap setting values are identical.

In FIG. 1 an equalizer stage 10' is shown surrounded a dashed line. Equalizer 10' is identical in every respect with equalizer 10 and the same reference character primed have been utilized for equalizer 10' to indicate the identity of its parts with the elements of equalizer 10. Equalizer 10' may be characterized as a slave equalizer in that it takes over the function of equalizer 10 during the recirculation of the converted output signal from summing amplifiers 19 or 19'. As will be seen more clearly in what follows, slave equalizer 10' is utilized in both the incremental and replacement modes of operation. To the extent already shown, the operation of the equalizer arrangement of FIG. 1 is identical with that described in connection with equalizer 10 until an output is provided from either of summing amplifiers or 19'. At this juncture, the output signal is not recirculated to the input of delay line 11 but is recirculated via conductor 20' to the input of delay line 11' of equalizer 10'. Conductor 20' is shown as a dot dash line in FIG. 1 to indicate that this conductor is present only when slave equalizer 10' is utilized. Once the output of summing circuit 19 or 19' has been applied via conductors 20 and 20' to the input of delay line 11, the output is modified in accordance with the tap settings of multipliers 14' associated with equalizer stage 10'. After the signal is modified, the signal passes via summing amplifier 13' and conductor 22' to tap adjusting means 16. Conductor 22' has been shown as a dot dash line in FIG. 1 to indicate that this conductor is utilized only when slave equalizer 10' is utilized. Once a signal is provided to tap adjusting means 16, its operation is no different from that described in connection with equalizer 10 described hereinabove. Mechanical linkages 15', however, are provided so that the taps settings of multipliers 14 and 14' may be adjusted at the same time. In this manner, an input signal represented by the function 1−A upon passing initially through equalizer 10 is modified by the system tap setting algorithm and, as a modified signal, upon recirculation, is again modified by the same system tap setting algorithm in slave equalizer 10'.

Slave equalizer 10', while it adds to the hardware requirements in practical embodiments of the present invention, permits a trade off between hardware and convergence time. Using slave equalizer 10', the convergence time, depending upon the number of delay and multipliers sections used in delay line 11 and 11' is substantially reduced over that of a single equalizer embodiment. Where the number of delay sections and multipliers used is relatively large, the convergence time can be substantially halved relative to the convergence time obtained when the single equalizer stage embodiment is utilized. The reduction in time results from the fact that in the single embodiment stage, a new input signal cannot be introduced until the recirculated and converted signal passes from delay line 11.

Considering now a more detailed operation of the single equalizer arrangement of FIG. 1, for a number of iterations, the tap settings of multipliers 14 associated with equalizer 10 are first set to 0 with the exception of the multiplier associated with the center tap of equalizer stage 10 which is set to unity. An input sequence represented by the function 1−A is then applied to the input of equalizer stage 10. Because all the tap settings of multipliers 14 are set to 0 with the exception of the multiplier associated with the center tap of equalizer 10, the input sequence 1−A passes through equalizer stage 10 and appears at the output of summing amplifier 13 substantially unchanged from the input sequence 1−A. With switch 18 connected to contact 17, the output of summing amplifier 13 is connected to either summing amplifier 19 or 19' depending upon whether the incremental or replacement mode of operation is desired.

Considering first the incremental mode, the output of summing amplifier 13 represented by the function 1−A is applied to summing amplifier 19 where 1 is added to the inverse of the input function. The output of summing amplifier 19 represented by the function A is recirculated via conductor 20 to the input of delay line 11. After being modified by the tap settings which still have their initial settings of 0 with the exception of the center tap which is set to 1, an output signal represented by the function A appears at the output of summing amplifier 13. With switch 18 connected to contact 21, the output represented by the function A is applied via conductor 22 to tap adjusting means 16. Tap adjusting means 16 provides a mechanical output in the manner described hereinabove in connection with FIG. 2 via mechanical linkages 15 which adjust the tap settings of multipliers 14 to a value proportional to the signals on AND gates 24 at the sampling instants.

In the incremental mode, the multipliers are set to a value represented by the function 1+A which is the value of the initial setting (1) of multipliers 14 plus the increment A. In actual practice, the adjustment of multipliers 14 consists of setting a plurality of potentiometers or attenuators to some given value. Thus, for each multiplier, a value is provided which substantially cancels or modifies the sidelobes of the input sequence to reduce the sidelobes to a minimum. Because of the interaction between the various portions of the input sequence, this is not accomplished in practice and further processing is required to further clean up the input sequence. The foregoing operation may be characterized as the $0^{th}$ iteration which sets the tap settings of equalizer stage 10 prior to the first iteration.

A new input sequence 1−A characterized as the first iteration is applied to the input of equalizer stage 10. This input sequence is modified by the tap setting function 1+A and provides at the output of summing amplifier 13 an output represented by the function $1-A^2$. This output passes via contact 17 of switch 18 to summing amplifier 19 which provides at its output a signal represented by the function $A^2$. This signal is recirculated via conductor 20 to the input of delay line 11 and is modified therein by the function 1+A which is the same modifying function which was present prior to the beginning of the first iteration. A signal represented by the function $A^2$ (1+A) appears at the output of summing amplifier 13 and is passed via contact 21 on switch 18 and conductor 22 to tap adjusting means 16. Tap adjusting means 16 then adjusts multipliers 14 via mechanical linkages 15 in accordance with the function $1+A+A^2+A^3$ the first two terms of which represent the tap setting at the outset of the first iteration and the last two terms of which represent the increment added to the original tap setting.

A new input sequence $1-A$ characterized at the second iteration is applied to the input of equalizer stage 10 where it is modified by the tap settings represented by the function $1+A+A^2+A^3$ which were obtained during the previous iteration to provide at the output of summer 13 a signal represented by the function $1-A^4$. This function is applied via contact 17 of switch 18 to summing amplifier 19 and is modified therein to provide at its output a signal represented by the function $A^4$. This signal is fed via conductor 20 to delay line 11 wherein it is modified by the tap settings which were adjusted prior to the beginning of the second iteration in accordance with the function $1+A+A^2+A^3$. A signal represented by the function $A^4(1+A+A^2n^3)$ is provided at the output of summing amplifier 13 and is applied via contact 21 of switch 18 and conductor 22 to tap adjusting means 16. Tap adjusting means 16 then adjusts multipliers 14 in accordance with the function $1+A+A^2+A^3+A^4+A^5+A^6+A^7$; the first four terms of which represent the tap setting applied at the beginning of the second iteration and the last four terms of which represent the increment added thereto.

From the foregoing, it should be clear that for each iteration the input sequence represented by the function $1-A$ is modified by a modifying function which, as the number of iterations increases, reduces the distortion of the system to a value approaching 0 very rapidly.

Each succeeding iteration is carried out in a manner similar to that shown in connection with previous iterations. Thus, for the $n^{th}$ iteration, an input function $1-A$ is modified finally by a system algorithm which is equivalent to the product of all the modifying functions of each iteration producing a modifying function equal to $1+A+A^2+\ldots+A^{2^n-1}$ where $n=0, 1, 2, 3, \ldots$. This latter function when multiplied by an input sequence $1-A$ results in an output $1-A^{2^n}$ at the output of equalizer 10. This output is normally applied to the input of a data receiver and further equalization is not required. In FIG. 1, with switch 18 connected to contact 30, the output of summing amplifier 13 is delivered in an equalized condition to a device such a receiver (not shown) and otherwise labeled OUTPUT in FIG. 1. In a normal case where the initial distortion is less than 100 percent, after about five iterations, the overall distortion in the system has been reduced to substantially 0 value and an equalized electrical signal has been achieved.

The description given hereinabove is summarized in the following TABLE 1 for the first three iterations using the arrangement of FIG. 1 operating in an incremental mode.

The foregoing TABLE 1 may also be utilized in connection with the operation of equalizers 10 and 10' in the incremental mode of operation. Appreciating that the multipliers 14, 14' of both equalizers are set to the same value it should be obvious that the tap adjusting algorithm for each equalizer is exactly the same and that a signal passing through equalizer arrangements 10 and 10' is modified twice by the same tap settings; a condition which also occurs when only one equalizer is utilized. The signals represented by the equation in TABLE 1 are exactly the same using equalizers 10, 10' except that the column labeled "Recirculated Output From Summer 13" should be "Recirculated Output From Summer 13'".

Considering now the operation of equalizer 10 in the replacement mode, the operation of equalizer 10 is similar to that described hereinabove in connection with equalizer 10 operating in the incremental mode. The only difference is that summing amplifier 19' is utilized instead of summing amplifier 19. Utilizing summing amplifier 19' the value 2 is added to the inverse of a function appearing at its input Thus, for the $0^{th}$ iteration when the tap settings of multipliers 14 are all set to 0 with the exception of a center tap, an input signal represented by the function $1-A$ appears as the function $1-A$ at the input of summing amplifier 19'. Adding the value 2 to the negative of the input function provides, at the output of summing amplifier 19' a signal represented by the function $1+A$. After recirculating the last mentioned function via conductor 20 through delay line 11, the tap settings of which are unchanged from their initial setting, a signal represented by the function $1+A$ appears at the output of summing amplifier 13 and is applied to tap adjusting means 16 via contact 21 of switch 18 and conductor 22. Just prior to providing mechanical outputs proportional to the output of AND gates 24, counter 27 of FIG. 2 provides an output to each of tap adjust drives 26 via conductor 29 which adjusts the tap settings of multipliers 14 to 0. After this, the tap adjustments of multipliers 14 are set to values determined by the algorithm $1+A$.

A new input sequence $1-A$ characterized as the first iteration is modified by the function $1+A$ in delay line 11 and provides at the output of summing amplifier 13 a signal represented by the function $1-A^2$. This function converted in summing amplifier 19' to a signal represented by the function $1+A^2$ is recirculated through delay line 11 wherein it is modified by the initial modifying function $1+A$ and produces at the output of summing amplifier 13 a signal represented by the function $1+A+A^2+A^3$. Tap adjusting means 16 provides outputs in accordance with the last mentioned function by adjusting the tap settings of multipliers 14 via mechanical linkages 15. A new input sequence $1-A$ characterized as the second iteration is applied to

TABLE I

| Number of iteration | Input | Initial plus incremental tap settings during iteration | Output summer 13 | Output summer 19 | Recirculated output summer 13 | Increment added to initial tap settings prior to next iteration |
|---|---|---|---|---|---|---|
| 0 | $1-A$ | 1 | $1-A$ | $A$ | $A$ | $A$ |
| 1 | $1-A$ | $1+A$ | $1-A^2$ | $A^2$ | $A^2(1+A)$ | $A^2+A^3$ |
| 2 | $1-A$ | $1+A+A^2+A^3$ | $1-A^4$ | $A^4$ | $A^4(1+A+A^2+A^3)$ | $(A^4+A^5+A^6+A^7)$ |
| 3 | $1-A$ | $1+A+A^2+A^3+A^4+A^5+A^6+A^7$ | $1-A^8$ | $A^8$ | $A^8(1+A+A^2+\ldots+A^7)$ | $(A^8+A^9+\ldots+A^{15})$ |
| $n$ | $1-A$ | $1+A+A^2+\ldots+A^{2n-1}$ | $1-A^{2n}$ | | | |

equalizer stage 10 where it is modified by the function $1+A+A^2+A^3$ and results in an output signal at the output of summing amplifier 13 represented by the function $1-A^4$. This last function modified in summing amplifier 19' to provide a signal represented by the function $1+A^4$ is recirculated through delay line 11 wherein it is once again modified by the tap settings which are unchanged from their settings at the outset of the second iteration. This modification provides at the output of summing amplifier 13 a signal represented by the function $1+A+A^2+ \ldots +A^7$. This latter function is applied to tap adjusting means 16 and, once again, the tap settings of multipliers 14 are adjusted in accordance with the last mentioned function.

Each succeeding iteration is operated on in a manner similar to that shown in connection with the previous iterations. Thus, for the $n^{th}$ iteration, an input function $1-A$ is modified by a modifying function which is in effect the product of all the modifying functions used in the previous iterations producing a modifying function equal to $1+A+A^2+ \ldots +A^{2^n-1}$. This latter function when multiplied by an input sequence $1-A$ results in an output $1-A^{2^n}$ at the output of equalizer 10.

The description given hereinabove in connection with the replacement mode of operation of equalizer 10 is summarized in the following TABLE II for the first three iterations.

Considering now briefly the replacement mode of operation utilizing equalizer 10 and slave equalizer 10', the signals represented by the mathematical expressions shown in TABLE II are exactly the same except that the column labeled "Recirculated Output of Summer 13" should be labeled "Recirculated Output of Summer 13'." The only difference in utilizing slave equalizer 10' is that the output of summing circuit 19' is not recirculated through delay line 11 but rather is recirculated through delay line 11' of slave equalizer 10'. Apart from this and the fact that this combination provides for faster convergence, there is no difference in the overall tap setting algorithm or in the output ultimately achieved.

In the practice of the foregoing invention, no specific implementation for the equalizer stages 10 and 10' has been given. However, commercially available transversal filters may be adapted in a manner well known to those skilled in the art to produce the equalizer stages of the present invention.

A typical arrangement utilizing only equalizer 10 would consist of a delay line 11 having nine delay sections. Typically, four or five iterations are all that are required to provide a reduction in the distortion of the system to substantially 0.

The following is a computer simulation of the operation of equalizer 10 of FIG. 1 in either the incremental or replacement mode.

While the invention has been particularly shown and described with reference to a preferred embodiment, it will be understood by those skilled in the art that the foregoing and other changes in form and details may be made therein without departing from the spirit and scope of the invention.

TABLE II

| Number of iteration | Input | Tap settings for each iteration | Output summer 13 | Output summer 19 | Recirculated output summer 13 | Replacement tap settings for next iteration |
|---|---|---|---|---|---|---|
| 0 | 1-A | 1 | 1-A | 1-A | $1+A$ | $1+A$ |
| 1 | 1-A | $1+A$ | $1-A^2$ | $1+A^2$ | $(1+A)(1+A^2)$ | $1+A+A^2+A^3$ |
| 2 | 1-A | $1+A+A^2+A^3$ | $1-A^4$ | $1+A^4$ | $(1+A^4)(1+A+A^2+A^3)$ | $1+A+A^2+ \ldots +A^7$ |
| 3 | 1-A | $1+A+A^2+ \ldots +A^7$ | $1-A^8$ | $1+A^8$ | $(1+A^2)(1+A+A^2+ \ldots +A^7)$ | $1+A+A^2+ \ldots +A^{15}$ |
| $n$ | 1-A | $1+A+A^2+ \ldots +A^{2^n-1}$ | $1-A^{2^n}$ | | | |

| | | | | | | | | | |
|---|---|---|---|---|---|---|---|---|---|
| Input sequence (1-A) | 0.153 | | −0.395 | | 1−0.255 | 0.0262 | | | |
| 0th iteration: | | | | | | | | | |
| Tap settings | 0 | 0 | 0 | 0 | 1 | 0 | 0 | 0 | 0 |
| Output | 0 | 0 | 0.153 | −0.395 | 1 | −0.255 | 0.0262 | 0 | 0 |
| Eye | 0.172 | | | | | | | | |
| 1st iteration: | | | | | | | | | |
| Tap settings | 0 | 0 | −0.153 | 0.395 | 1 | 0.255 | −0.0262 | 0 | 0 |
| Output | −0.0234 | 0.121 | 0.156 | 0.0778 | 0.791 | 0.0207 | −0.0648 | 0.0133 | −0.000687 |
| Eye | 0.397 | | | | | | | | |
| 2nd iteration: | | | | | | | | | |
| Tap settings | −0.0481 | −0.0413 | −0.0909 | 0.445 | 1.17 | 0.317 | 0.0225 | 0.00396 | −0.00441 |
| Output | −0.0457 | 0.0749 | −0.0792 | 0.0552 | 0.93 | 0.0231 | −0.0298 | 0.00828 | −0.00483 |
| Eye | 0.632 | | | | | | | | |
| 3rd iteration: | | | | | | | | | |
| Tap settings | −0.0365 | −0.0758 | −0.0527 | 0.437 | 1.22 | 0.325 | 0.0468 | 0.00588 | −0.00113 |
| Output | −0.0146 | 0.0211 | −0.0205 | 0.0167 | 0.986 | 0.00863 | −0.0065 | 0.00294 | −0.0014 |
| Eye | 0.897 | | | | | | | | |
| 4th iteration: | | | | | | | | | |
| Tap settings | −0.0282 | −0.0877 | −0.0415 | 0.429 | 1.23 | 0.322 | 0.0511 | 0.00472 | −0.000139 |
| Output | 7.25E−5 | 0.00130 | −0.00142 | 0.00118 | 0.999 | 0.000643 | −0.00042 | 0.000194 | −1.66E−6 |
| Eye | 0.988 | | | | | | | | |
| 5th iteration: | | | | | | | | | |
| Tap settings | −0.0289 | −0.0888 | −0.0407 | 0.428 | 1.23 | 0.321 | 0.0514 | 0.00459 | −0.000181 |
| Output | −2.42E−5 | 7.38E−6 | −5.28E−6 | 5.12E−6 | 1 | 2.71E−6 | −1.87E−6 | 2.25E−6 | −3.38E−6 |
| Eye | 0.993 | | | | | | | | |

NOTE.—Eye is the summation of the absolute values of the sidelobe divided by the value of the main pulse.

What is claimed is:

1. A method for equalizing an electrical signal sequence represented by the function $1-A$ comprising the steps of:

applying for $n$ iterations said electrical signal to at least one equalizer having a plurality of adjustable tap settings, and, modifying said signal to adjust said tap settings of said at least one equalizer in accordance with the function $1+A+A^2+\ldots+A^{2^n-1}$ said function having $n+1$ terms to produce at the output of said at least one equalizer for each iteration the product represented by the function $1-A^{2^n}$ where $n=1, 2, 3, \ldots$, and, in terms of $z$ transform, $A=\alpha_{-N}z^N+_{-N+1}z^{N-1}+\ldots\alpha_0+\ldots\alpha_N 2^{-N}$ wherein $\alpha$ is the amplitude value of a signal at a sampling instant and the subscripts associated with the term $\alpha$ are the numbers of the sampling instants before and after a main pulse.

2. A method for equalizing according to claim 1 wherein the step of modifying said signal includes the steps of:

applying said signal to said at least one equalizer to obtain at the output thereof a modified signal represented by the function $1-A^{2^n}$, converting said modified signal in a summing circuit to obtain a signal represented by the converted function $1+A^{2^n}$, recirculating said converted function through said at least one equalizer to obtain a signal represented by the function $1+A+A^2+\ldots+A^{2^n-1}$, and replacing the tap settings utilized during the $n^{th}$ iteration with new tap settings in accordance with a signal represented by said last mentioned function.

3. A method for equalizing according to claim 1 wherein the step of modifying said signal includes the steps of:

applying said signal to said at least one equalizer to obtain at the output thereof a modified signal represented by the function $1-A^{2^n}$, converting said modified signal in a summing circuit to obtain the converted function $1+A^{2^n}$, recirculating said converted function through a slave equalizer having a plurality of tap settings to obtain a signal represented by the function $1+A+A^2+\ldots+A^{2^n-1}$, and replacing the tap settings of said at least one equalizer and said slave equalizer utilized during the $n^{th}$ iteration with new tap settings in accordance with a signal represented by said last mentioned function.

4. A method for equalizing according to claim 1 wherein the step of modifying said signal includes the steps of:

applying said signal to said at least one equalizer to obtain at the output thereof a modified signal represented by the function $1-A^{2^n}$, converting said modified signal in a summing circuit to obtain a signal represented by the converted function $A^{2^n}$, recirculating said converted function through said at least one equalizer to obtain a signal represented by the incrementing function $A^{2^n+1}+A^{2^{n2+}}+\ldots+A^{2^{(n+1)}-1}$ said incrementing function having $2^n$ terms, and, incrementing the tap settings utilized during the $n^{th}$ iteration with said incrementing function to provide a new tap setting represented by the function $1+A+A^2+\ldots+A^{2^n-1}$.

5. A method for equalizing according to claim 1 wherein the step of modifying said signal includes the step of:

applying said signal to said at least one equalizer to obtain at the output thereof a modified signal represented by the function $1-A^{2^n}$, converting said modified signal in a summing circuit to obtain a signal represented by the converted function $A^{2^n}$, recirculating said converted function through a slave equalizer having a plurality of tap settings to obtain a signal represented by the incrementing function $A^{2^n+1}+A^{2^{n2+}}+\ldots+A^{2^{(n+1)}-1}$ said function having $2^n$ terms, and, incrementing the tap settings utilized during the $n^{th}$ iteration with said incrementing function to provide a new tap setting represented by the function $1+A+A^2+\ldots+A^{2^n-1}$.

6. A method according to claim 2 wherein the step of converting said modified signal includes the step of adding 2 to the negative of said modified signal.

7. A method according to claim 3 wherein the step of converting said modified signal includes the step of adding 2 to the negative of said modified signal.

8. A method according to claim 4 wherein the step of converting said modified signal includes the step of adding 1 to the negative of said modified signal.

9. A method according to claim 5 wherein the step of converting said modified signal includes the step of adding 1 to the negative of said modified signal.

10. Apparatus for equalizing an electrical signal sequence represented by the function $1-A$ comprising:

input means for applying said electrical signal for $n$ iterations to at least one equalizer having a plurality of tap settings and means connected to said at least one equalizer for modifying said signal to adjust said tap settings of said at least one equalizer in accordance with the function $1+A+A^2\ldots+A^{2^n-1}$ said function having $n+1$ terms to produce at the output of said at least one equalizer for each iteration the product represented by the function $1-A^{2^n}$ when $n=1, 2, 3, \ldots$, and, in terms of $z$ transform, $A=\alpha_{-N}2^N\alpha_{-N+1}z^{N-1}a2z\ldots\alpha_0+\ldots\alpha_N 2^{-N}$ wherein $\alpha$ is the amplitude value of a signal at a sampling instant and the subscripts associated with the term $\alpha$ are the numbers of the sampling instants before and after a main pulse.

11. Apparatus according to claim 10 wherein said means for modifying includes:

first modifying means connected to said at least one equalizer for modifying said electrical signal to provide at the output thereof a modified signal represented by the function $1-A^{2^n}$, means connected to said output for converting said modified signal to provide a signal represented by the converted function $1+A^{2^n}$, means for recirculating said converted function through said at least one equalizer connected to said converting means to provide at said equalizer output a signal represented by the function $1+A+A^2+\ldots+A^{2^n-1}$, and, means connected to said tap settings and said equalizer output for replacing the tap settings utilized during the $n^{th}$ iteration with new tap settings in accordance with a signal represented by said last mentioned function.

12. Apparatus according to claim 10 wherein said means for modifying includes:

first modifying means connected to said at least one equalizer for modifying said electrical signal to provide at the output thereof a modified signal represented by the function $1-A^{2^n}$, means connected to said output for converting said modified signal to provide a signal represented by the converted function $1+A^{2^n}$, second modifying means connected to said converting means for modifying said converted function to provide a signal represented by the function $1+A+A^2+A^{am}+\ldots+A^{2^n-1}$, and, means connected to said tap settings and said first and second modifying means for replacing the tap settings utilized during the $n^{th}$ iteration with new tap settings in accordance with a signal represented by said last mentioned function.

13. Apparatus according to claim 10 wherein said means for modifying includes:

first modifying means connected to said at least one equalizer for modifying said electrical signal to provide at the output thereof a modified signal represented by the function $1-A^{2^n}$, means connected to said output for converting said modified signal to provide a signal represented by the converted function $A^{2^n}$, means for recirculating said converted function through said at least one equalizer to obtain a signal represented by the incrementing function $A^2+A^{2^n+1}+A^{2^n+2}+\ldots+A^{2^{(n+1)}-1}$ said incrementing function having $2^n$ terms, and, means connected to said recirculating means and said first modifying means for incrementing the tap settings utilized during the $n^{th}$ iteration to provide a new tap setting represented by the function $1+A+A^2+\ldots+A^{2^n-1}$.

14. Apparatus according to claim 10 wherein said means for modifying includes:

first modifying means connected to said at least one equalizer for modifying said electrical signal to provide at the output thereof a modified signal represented by the function $1-A^{2^n}$, means connected to said output for converting said modified signal to provide a signal represented by the converted function $A^{2^n}$, second modifying means connected to said converting means for modifying said converted function to provide a signal represented by the incrementing function $A^2+A^{2^n+1}+A^{2^{n}2+}+\ldots+A^{2^{(n+1)}-1}$ said incrementing function having $2^n$ terms, and, means connected to said tap settings and said first and second modifying means for incrementing the tap settings utilized during the $n^{th}$ iteration to provide a new tap setting represented by the function $1+A+A^2+\ldots+A^{2^n-1}$.

15. Apparatus according to claim 11 wherein said first modifying means includes a plurality of multipliers the gains of which are adjusted to produce said modified signal.

16. Apparatus according to claim 11 wherein said means for converting includes a summing amplifier which adds 2 to the negative of the modified signal represented by the function $1-A^{2^n}$.

17. Apparatus according to claim 11 wherein said means for recirculating includes a feedback path between the output of said converting means and said input means of said at least one equalizer.

18. Apparatus according to claim 11 wherein said means for replacing the tap setting includes tap adjusting means connected to said plurality of tap settings and said output of said at least one equalizer responsive to said signal represented by the function $1+A+A^2+\ldots+A^{2^n-1}$.

19. Apparatus according to claim 12 wherein said first modifying means includes a plurality of multipliers the gains of which are adjusted to produce said modified signal.

20. Apparatus according to claim 12, wherein said means for converting includes a summing amplifier which adds to 2 to the negative of the modified signal represented by the function $1-A^{2^n}$.

21. Apparatus according to claim 12, wherein said second modifying means includes a second equalizer identical to said at least one equalizer and a feedback path between the output of said converting means and the input of said second equalizer.

22. Apparatus according to claim 12, wherein said means for replacing the tap settings includes tap adjusting means connected to said plurality of said tap settings and the output of said second equalizer responsive to said signal represented by the function $1+A+A^2+\ldots+A^{2^n-1}$.

23. Apparatus according to claim 13, wherein said first modifying means includes a plurality of multipliers the gains of which are adjusted to produce said modified signal.

24. Apparatus according to claim 13 wherein said means for converting includes a summing amplifier which adds 1 to the negative of the modified signal represented by the function $1-A^{2^n}$.

25. Apparatus according to claim 13, wherein said means for recirculating includes a feedback path between the output of said converting means and said input means of said at least one equalizer.

26. Apparatus according to claim 13, wherein said means for incrementing the tap settings includes tap adjusting means connected to said plurality of tap settings and said output of said at least one equalizer responsive to said signal represented by said incrementing function.

27. Apparatus according to claim 14, wherein said first modifying means includes a plurality of multipliers the gains of which are adjusted to produce said modified signal.

28. Apparatus according to claim 14, wherein said means for converting includes a summing amplifier which adds 1 to the negative of the modified signal represented by the function $1-A^{2^n}$.

29. Apparatus according to claim 14, wherein said second modifying means includes a second equalizer identical to said at least one equalizer and a feedback path between the output of said converting means and the input of said second equalizer.

30. Apparatus according to claim 14, wherein said means for incrementing the tap settings includes tap adjusting means connected to said plurality of tap settings and said output of said second equalizer responsive to said signal represented by said incrementing function.

* * * * *

UNITED STATES PATENT OFFICE
CERTIFICATE OF CORRECTION

Patent No. 3,727,153 Dated April 10, 1973

Inventor(s) Gerald K. McAuliffe

It is certified that error appears in the above-identified patent and that said Letters Patent are hereby corrected as shown below:

Col. 15, line 8, Change $N^{z^{N}+}{}_{-N+1}{}^{z^{N-1}}$ to $N^{z^{N}+\alpha}{}_{-N+1}{}^{z^{N-1}}$ Col. 15, line 56, Change $A^{2^{n}+1}+A^{2^{n2+}}$ to $A^{2^{n}}+A^{2^{n}+1}+A^{2^{n}+2}$ Col. 16, line 10, Change $A^{2^{n}+1}+A^{2^{n2+}}$ to $A^{2^{n}}+A^{2^{n}+1}+A^{2^{n}+2}$ Col. 16, line 40, Change $A=\alpha_{-N}2^{N}\alpha_{-N+}$ to $A=\alpha_{-N}z^{N}+\alpha_{-N+}$ Col. 16, line 41, Change ${}_{1}Z^{N-1}a2Z \ldots \alpha_{o}+ \ldots \alpha_{N}2^{-N}$ to $1^{z^{N-1}}+ \ldots \alpha_{0}+ \ldots \alpha_{N}z^{-N}$ Col. 17, line 11, Change $A^{2}+A^{am}$ to $A^{2}+A^{3}$ Col. 17, line 28, Change $A^{2}$ to $A^{2n}$ Col. 17, line 48, Change $A^{2}+A^{2^{n}}$ to $A^{2^{n}}+A^{2^{n}}$ Signed and sealed this 6th day of August 1974.

(SEAL)
Attest:

McCOY M. GIBSON, JR.
Attesting Officer

C. MARSHALL DANN
Commissioner of Patents